United States Patent [19]

Fedeli

[11] Patent Number: 5,029,877
[45] Date of Patent: Jul. 9, 1991

[54] SEAL FOR A THREAD DRIVE
[75] Inventor: Giancarlo Fedeli, Foligno, Italy
[73] Assignee: FAG Kugelfischer Georg Schafer (KGaA), Fed. Rep. of Germany
[21] Appl. No.: 352,978
[22] Filed: May 17, 1989
[30] Foreign Application Priority Data
  May 20, 1988 [DE]  Fed. Rep. of Germany ....... 3817172
[51] Int. Cl.⁵ .............................................. F16J 15/16
[52] U.S. Cl. ................................ 277/165; 74/424.8 R; 277/167; 277/203
[58] Field of Search ................. 277/24, 137, 167, 186, 277/198, 203, 217, 165; 74/424.8 R
[56] References Cited

U.S. PATENT DOCUMENTS

| | | | |
|---|---|---|---|
| 1,174,598 | 3/1916 | Mix | 277/217 |
| 1,523,828 | 1/1925 | Nilson | 277/217 |
| 3,116,931 | 1/1964 | Edwards | 277/198 X |
| 3,646,827 | 3/1972 | Patterson | 277/165 X |
| 3,669,460 | 6/1972 | Wysong | |
| 4,052,076 | 10/1977 | Wysong | 277/24 |
| 4,053,167 | 10/1977 | Jelinek | 277/167 X |
| 4,150,835 | 4/1979 | Wheelock | 277/203 X |
| 4,175,475 | 11/1979 | Eckhardt | 277/203 X |
| 4,226,431 | 10/1980 | Jelinek et al. | 277/165 |
| 4,286,793 | 9/1981 | Ploss et al. | 277/167 X |
| 4,407,511 | 10/1983 | Benton et al. | 277/24 |
| 4,645,437 | 2/1987 | Sakashita et al. | 277/217 X |
| 4,795,172 | 1/1989 | Brande | 277/203 X |

FOREIGN PATENT DOCUMENTS

| | | | |
|---|---|---|---|
| 693131 | 6/1940 | Fed. Rep. of Germany | 277/203 |
| 468318 | 7/1937 | United Kingdom | 277/217 |

Primary Examiner—William A. Cuchlinski, Jr.
Assistant Examiner—Scott Cummings
Attorney, Agent, or Firm—Ostrolenk, Faber, Gerb & Soffen

[57] ABSTRACT

A seal for a thread drive including several ring parts arranged one within the other, to provide a dependable and compact unit comprised of a few parts. A sealing ring which surrounds and rests against the threaded spindle is comprised of rigid plastic. The sealing ring is a single thread section with axially separated ends which are integrally joined together by a transverse connection which closes the thread gap between the separated ends. A pretensioned tension ring surrounds the sealing ring. A housing ring surrounds both other rings. A wiper or scraper may be located on the sealing ring opposite the transverse connection.

8 Claims, 4 Drawing Sheets

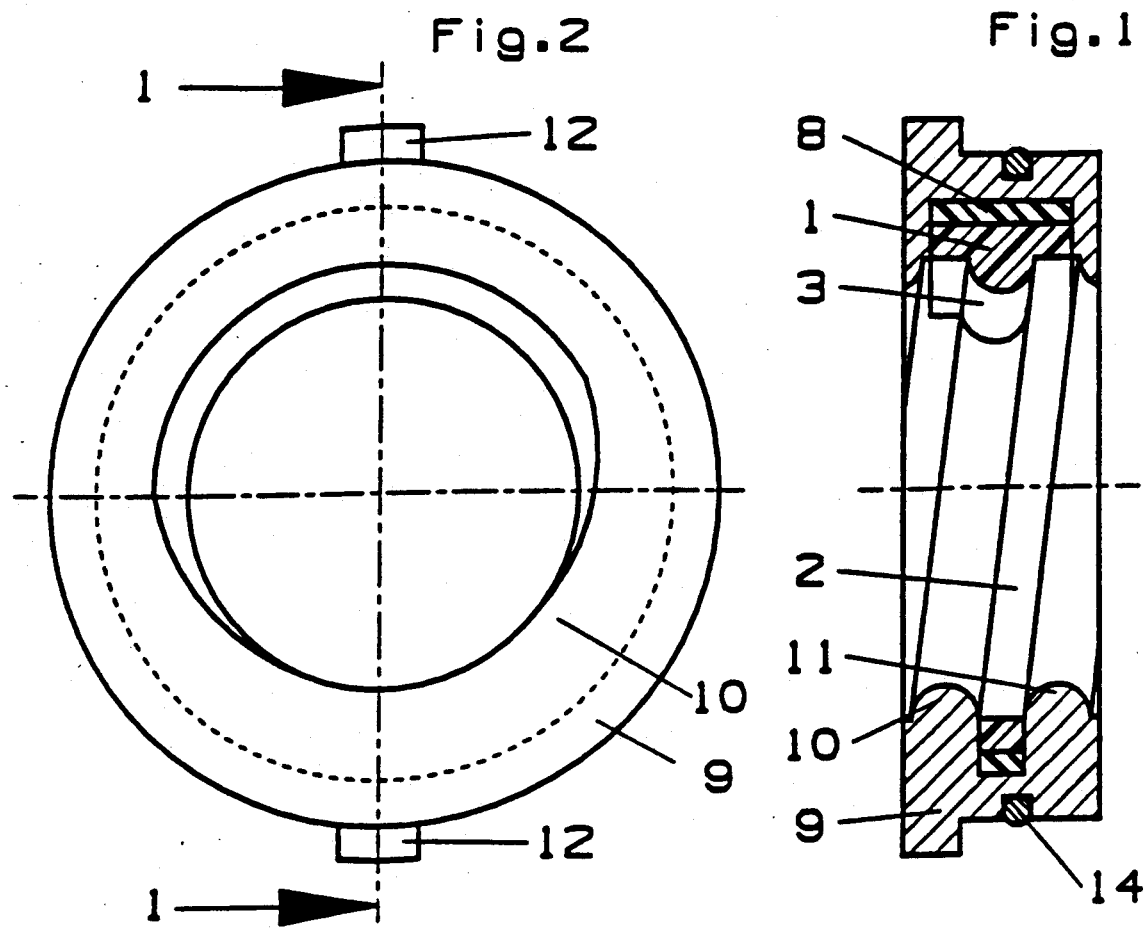
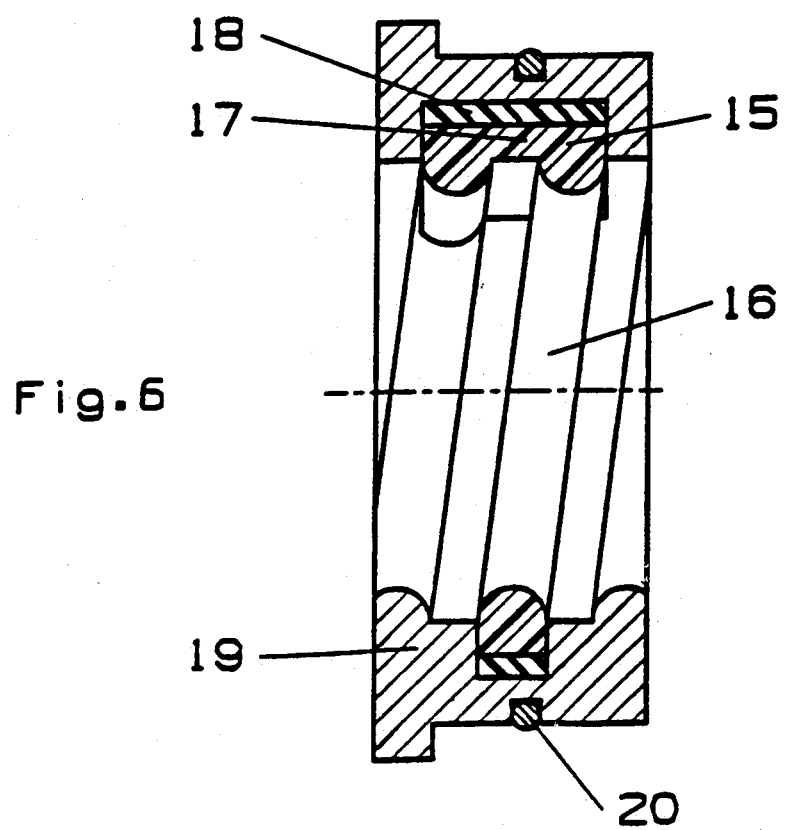

SEAL FOR A THREAD DRIVE

BACKGROUND OF THE INVENTION

The invention relates to a seal for a ball-thread drive of several parts assembled Ball-thread drives are employed, in particular, for the adjustment of the landing flaps of aircraft. They must be very dependable in operation. Since these drives are not arranged in enclosed spaces, extremely good seals are required, to prevent both the emergence of lubricant axially along the thread drive seal from the inside toward the outside and the penetration of dirt axially along the seal toward the inside. In addition, the seals are intended to act as ice breakers. Furthermore, they are to be compact in order to achieve the lowest possible weight A seal which satisfies some of these requirements is described in U.S. Pat. No. 3,669,460. There a sealing ring extends over one thread start in a housing ring. The sealing ring is pressed into the thread groove by a circular elastic spring. The thread gap is, in this case, closed by a separate transverse connection. This embodiment includes a great number of separate parts whose assembly is complicated There is furthermore no dependable unit of these parts in disassembled condition. The separate transverse connection, for instance, can fall out. In particular, transverse gaps can arise on the end surfaces of the transverse connection toward the sealing ring. These gaps substantially reduce the sealing action, in particular upon changes in temperature and wear of the sealing ring.

SUMMARY OF THE INVENTION

It is the object of the invention to improve a seal for a ball thread drive to avoid the above mentioned disadvantages and to provide a dependable and compact unit consisting of few parts.

In accordance with the invention, the so-called fine seal is achieved by an inner seal ring of rigid plastic which rests against the threaded spindle with a certain pressure. The sealing ring has only a single thread turn. Since the thread is a spiral or helix, from one end of the ring to the other end of the ring around a single thread produces an axial thread gap between the ring ends. The thread gap produced between the two ends of the ring is closed by an integral transverse connection that extends between those ring ends. This ring and the transverse connection prevents lubricants from axially passing the seal toward the outside of the ring and prevents dirt from getting inside the ring. The single thread length sealing ring can have various cross-sections. It can fill the space toward the thread head surface, the space toward the thread groove or the space consisting of a partial combination of these possibilities. This produces a more easily handled seal which is free of transverse gaps, and thus provides a good sealing.

In another development, a tension ring is provided around the inner sealing ring, and approximately congruent in axial shape with it. The tension ring is rectangular in cross-section or is of any other desired shape, and it is made of flexible material.

Since the inside diameter of the tension ring is somewhat smaller than the outside diameter of the inner sealing ring, the inner sealing ring is pressed onto the threaded spindle with a certain pressure, and without a substantial change in the pressure conditions occurring in the course of time.

In order for the innermost sealing ring of the rigid plastic to be able to adapt itself always optimally to the threaded spindle, the sealing ring has a transverse slot. Overlapping sections are provided in the slot region in order to avoid an open connecting gap between the axial inside and the outside. The circumferential size adaptation to the threaded spindle is effected by gaps at the end sides of the overlapping sections which are opposite each other.

The two rings described above can be further surrounded by a housing ring of metal or of rigid plastic. The housing ring has radially inwardly directed flanges on both axial sides so that it grips around the other two rings on their axial sides. In this way, not only is the tension ring well enclosed, but a structural unit is also obtained before the seal has been inserted on the threaded spindle. The axially outer flange of the housing ring has a surface which is adapted to the threaded spindle in order to scrape off, in the most favorable manner, any ice possibly seated on the threaded spindle. Since there is only a slight gap toward the threaded spindle, the ice is not only well removed from the spindle, it is also kept away from the inner sealing ring. Securement of the seal against rotation in the threaded spindle housing is also important for proper functioning. For this purpose, the housing ring has a radial projection which extends into a groove of the housing. The inside profile of the housing ring can alternatively be defined directly in the housing for the spindle, making it possible to dispense with the housing ring.

In accordance with one preferred embodiment, a similarly shaped scraping element can be provided approximately diametrically opposite the transverse connection of the inner sealing ring. This assures that both the lubricant and the dirt are better kept away by not passing by the sealing ring. This effect is further increased if the two circumferential end sides of both the transverse connection and the scraper element have oblique surfaces that are inclined toward these corresponding bodies. Thus, the lubricant or the dirt are moved further away from the gap between the spindle and the sealing ring.

The ice breaker function of the axially outer flange of the housing ring may be further increased when that flange is provided with at least one axially extending interruption. The resulting sharp edge favors the removal of the ice from the threaded spindle.

Other objects and features of the present invention will become apparent from the following description of the preferred embodiments of the invention considered in conjunction with the accompanying drawings.

BRIEF DESCRIPTION OF THE DRAWINGS

FIG. 1 is a longitudinal section through a seal in accordance with the invention;

FIG. 2 is an axial top view on the seal of FIG. 1;

FIG. 6 shows a variant of the seal of FIG. 1.

DESCRIPTION OF THE PREFERRED EMBODIMENTS

In accordance with FIGS. 1 and 2, the seal for a ball-thread drive comprises an inner sealing ring 1 of rigid plastic for resting against a threaded spindle (not shown). The inner sealing ring has a section 2 with one thread which is located opposite the thread head surface. The one thread section 2 corresponds to one complete circumferential thread on the spindle. That section cooperates with a transverse connection 3, which closes the thread gap between the two axially separated or staggered ends of the section 2, to effect a seal toward the threaded spindle.

Figure 3:
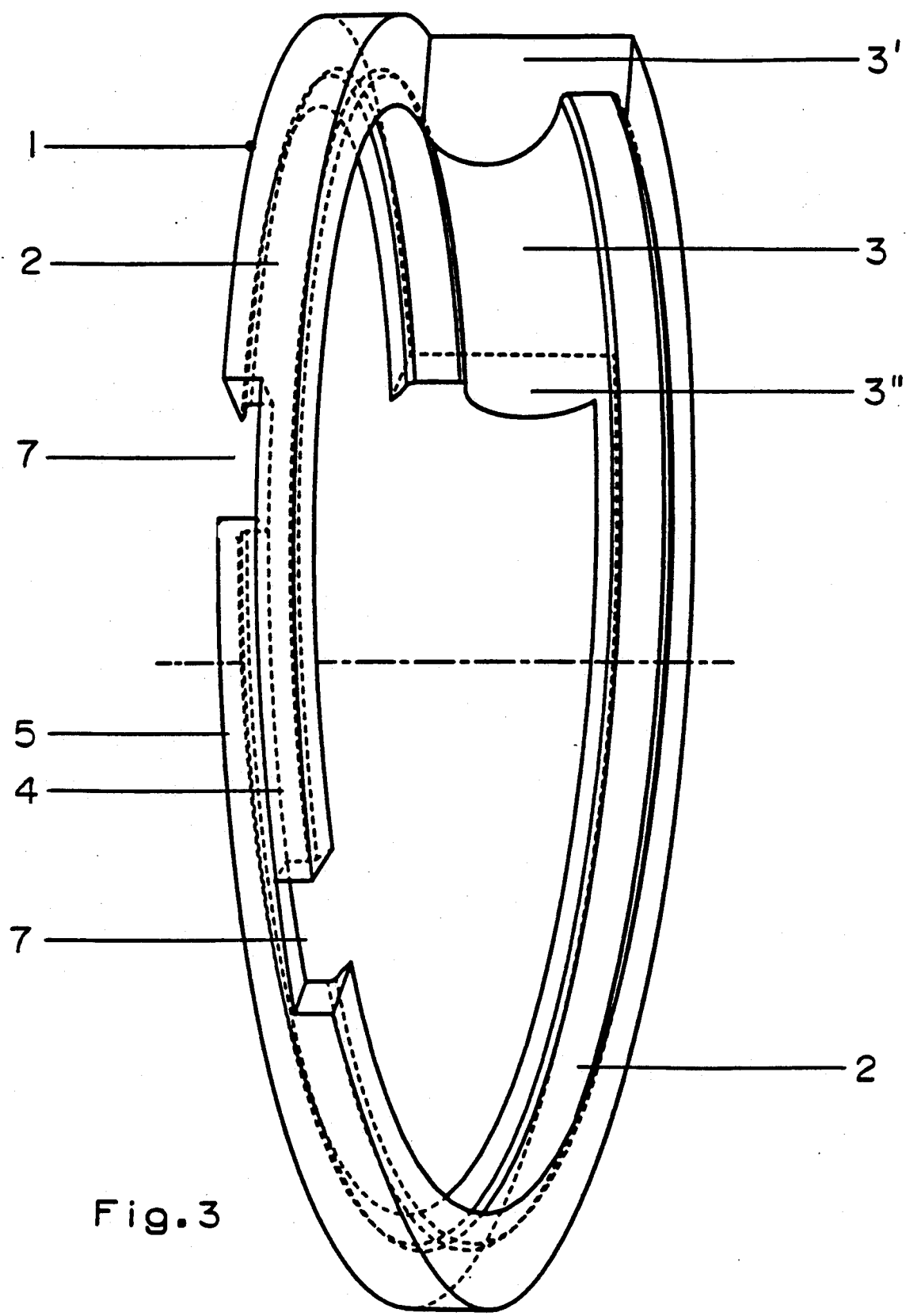
FIG. 3 is a perspective view of the inner sealing ring of FIG. 1.

The slit shape of the inner sealing ring 1 can be noted from FIG. 3. For defining that slit, mutually overlapping projections 4 and 5 are provided at a place on the circumference of section 2. Despite the slit shape of the sealing ring 1, no open connections between the axial inside and outside are produced. The gaps 7 are provided to make possible adaptation of the sealing ring to variable diameters in the circumferential direction. Therefore, if adaptation becomes necessary due to temperature differences between the parts or due to wear of the ring 1 or of the spindle, the adaptation can take place without impairing the sealing action since the overlapping projections 4 and 5 and the gaps 7 permit the required changes in diameter.

The radial pressure required for the sealing ring 1 is provided by the tension and sealing ring 8 of flexible material, which is approximately congruent with and which surrounds the sealing ring 1, and the ring 8 exerts a radial pre-tensioning on the sealing ring 1.

Figure 4:
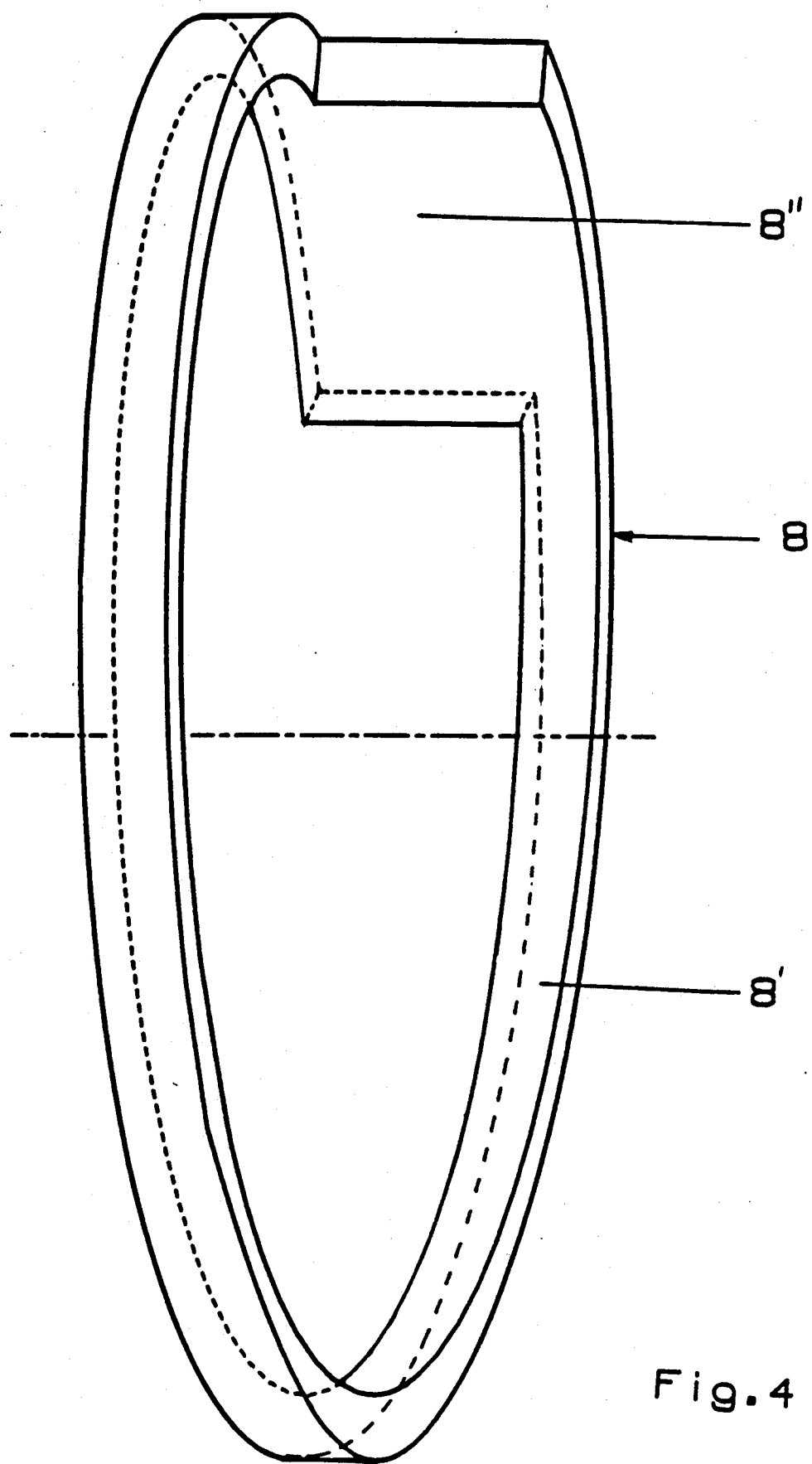
FIG. 4 is a perspective view of the tension ring of FIG. 1.

The shape of the tension ring 8 can be noted from FIG. 4. It includes the thread section 8' which is opposite the sealing ring section 2 and also includes the required connecting section 8" which overlies the transverse connection 3.

Sealing ring 1 and tension ring 8 are in turn surrounded by a housing ring 9 of metal or of rigid plastic for producing a structural unit which can be easily assembled. The housing ring 9 has two axially separated flanges 10 and 11 which surround the two inner rings 1 and 8 and the rings 1 and 8 are axially between the flanges 10 and 11. The flanges also have a profile in the region of the bore of the ring 9 that is axially outward of the rings 1 and 8, which is adapted to the threaded spindle inside the ring 9. That profile of the ring 9 results in a pre-sealing with additional ice breaker function for the axially outer flange 10 and a pre-sealing function against the emergence of lubricant for the inner flange 11. In order to avoid an impermissible turning of the seal, the housing ring 9 has on its circumference two radial projections 12 which engage in grooves of the housing (not shown). A static seal 14 is provided between the housing ring and the housing spindle.

Figure 5:
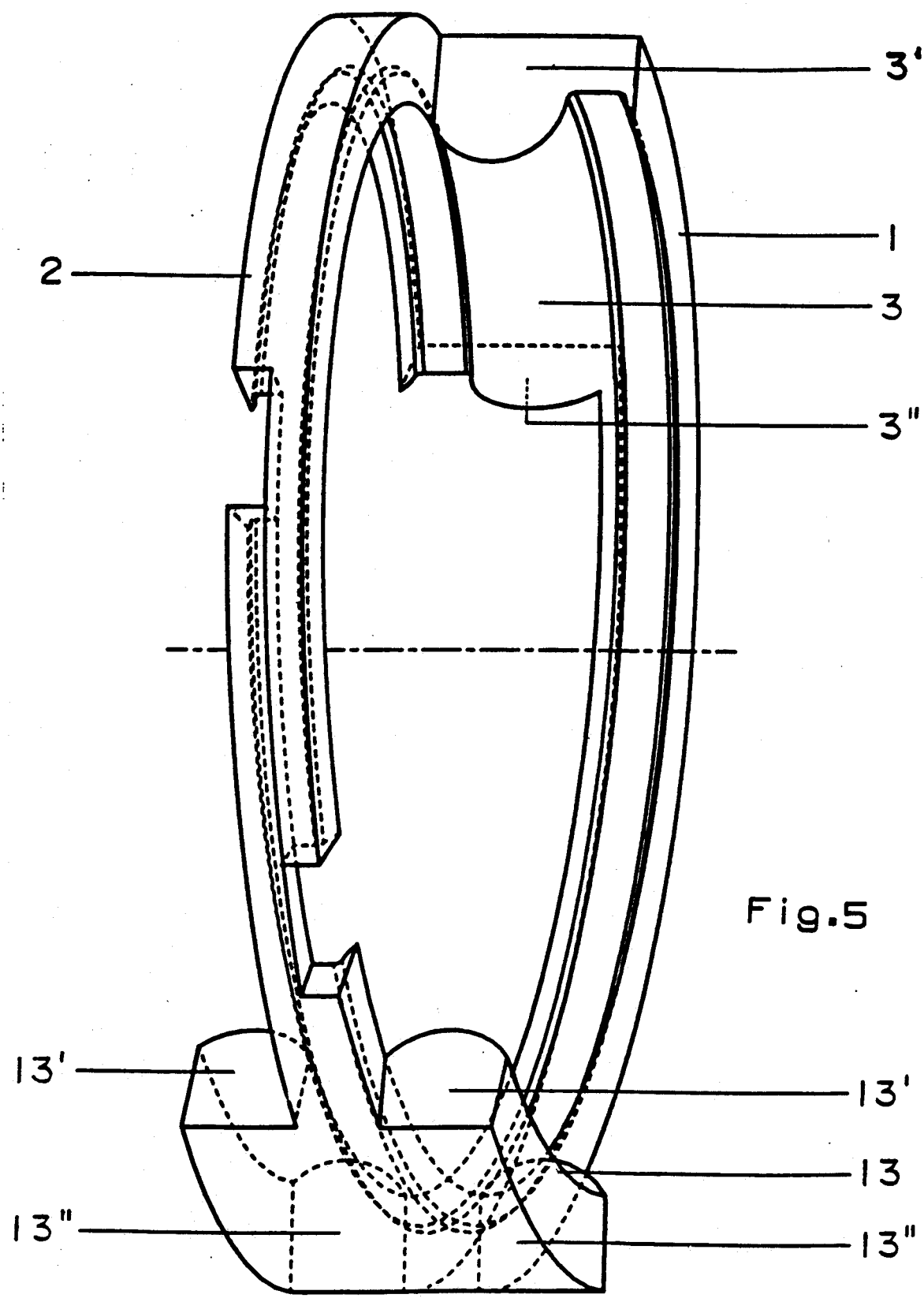
FIG. 5 shows a variant of the inner sealing ring of FIG. 3.

In order to increase the sealing action, as can be noted from FIG. 5, a scraper element 13 is provided on the sealing ring 1 approximately diametrically opposite the transverse connection 3. The surface of the bore of the scraper element also corresponds to the shape of the opposite thread profile of the spindle. Since the circumferential end sides 3' and 3", as well 13' and 13", of the transverse connection 3 and of the scraper element 13 have obliquely inclined surfaces, the scraped-off lubricant or dirt is conducted away from the corresponding sealing gaps and a better sealing effect is obtained.

FIG. 6 shows a wider embodiment of a seal, as compared to FIG. 1. The single-thread section of the inner sealing ring 15 has, in this case, a profile 16 which corresponds to the opposite thread groove. Also in this case, a transverse connection 17 is required. Furthermore, the sealing unit is supplemented in the same way by the tension ring 18 and the housing ring 19, as in the embodiment of FIG. 1.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A dependable and compact seal for a thread drive, comprising:

an inner sealing ring for being applied around and resting against a threaded spindle, the sealing ring including a single thread section for extending around a single spindle thread, the single thread section having opposite ends which are axially separated at the axial ends of a single thread of the spindle, thereby defining a thread gap between those axial ends;

a transverse connection integrally formed on the sealing ring for extending between the ends of the single tread section and closing the thread gap between the ends;

in a circumferential region away from the transverse connection, the sealing ring having a slot through the sealing ring defined at and by circumferentially extending and circumferentially overlapping projections, the projections being of respective circumferential lengths and each extending circumferentially toward the ring section of the inner sealing ring having the other projection and being spaced from that other ring section of the inner sealing ring a distance to define a gap in the circumferential direction between the end of each projection and the other section of the inner sealing ring, and the gap being positioned so that the diameter of the inner sealing ring may be increased or decreased while the overlapping projections remain overlapping, and the increase in diameter enlarges the gaps while the decrease in diameter decreases the gaps in the circumferential direction;

a wiping element defined on the sealing ring circumferentially spaced away from the transverse connections of the sealing ring, the wiping element being shaped for corresponding to the thread profile of the spindle and being positioned for extending into the thread profile of the spindle;

a tensioning ring located radially outside the sealing ring, the tensioning ring being shaped to axially approximately overlie the sealing ring, the tensioning ring being of flexible material and being pretensioned against the sealing ring; and a housing ring disposed radially outside the tensioning ring, the housing ring including two radially inwardly directed flanges disposed on opposite axial sides of the tensioning ring and of the sealing ring, whereby the housing ring holds the tensioning ring and the sealing ring in a predictable axial arrangement.

2. The sealing of claim 1, wherein the sealing ring and its transverse connection is comprised of a rigid plastic material.

3. The sealing of claim 1, wherein at least one of the flanges of the housing ring has a radially inward surface which is adapted to and is engageable in the thread of the threaded spindle.

4. The sealing of claim 3, wherein the housing ring has a circumferential wall surface for being received in a housing and has a radial projection extending from the wall surface for being received in an appropriate groove or the like in the housing.

5. The seal of claim 1, wherein the wiping element is approximately diametrically opposite the transverse connection.

6. The seal of claim 5, wherein the transverse connection has circumferentially opposite ends and the wiping element also has circumferentially opposite ends, and those ends all have respective surfaces which are inclined obliquely with respect to the respective transverse connection and wiping element, for conveying dirt away from the thread gap.

7. The sealing of claim 1, wherein the thread drive is a ball thread drive for adjusting a landing flap of an aircraft.

8. The seal of claim 1 wherein the wiping element of the sealing ring comprises a first portion at one axial side of the sealing ring and a second portion at the opposite axial side, the first and second portions having a shape corresponding to the thread profile of the spindle.

* * * * *